(12) United States Patent
Pedersen et al.

(10) Patent No.: US 6,985,754 B1
(45) Date of Patent: Jan. 10, 2006

(54) RADIO TERMINAL FOR BROWSING THE INTERNET

(75) Inventors: Claus Pedersen, Vallensbaek (DK); Lars Bohn Hansen, Holte (DK)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/959,414

(22) PCT Filed: Apr. 25, 2000

(86) PCT No.: PCT/EP00/03694

§ 371 (c)(1),
(2), (4) Date: Feb. 26, 2002

(87) PCT Pub. No.: WO00/65800

PCT Pub. Date: Nov. 2, 2000

(30) Foreign Application Priority Data

Apr. 26, 1999 (GB) .................................. 9909562
Jun. 7, 1999 (GB) .................................. 9913196

(51) Int. Cl.
*G06F 7/00* (2006.01)
(52) U.S. Cl. ................. 455/556.2; 455/556.1; 709/203; 370/351
(58) Field of Classification Search ............ 705/5; 709/256, 14, 203; 455/556.1–556.2, 557, 455/560, 550.1, 455, 449; 370/351–356
See application file for complete search history.

(56) References Cited

U.S. PATENT DOCUMENTS

| | | | | |
|---|---|---|---|---|
| 5,895,471 A | | 4/1999 | King et al. ................. 707/104 |
| 6,094,587 A | * | 7/2000 | Armanto et al. ............ 455/567 |
| 6,185,551 B1 | * | 2/2001 | Birrell et al. ................... 707/3 |
| 6,269,336 B1 | * | 7/2001 | Ladd et al. ................. 704/270 |
| 6,463,304 B2 | * | 10/2002 | Smethers ..................... 455/566 |
| 6,587,684 B1 | * | 7/2003 | Hsu et al. ................... 455/419 |
| 6,615,276 B1 | * | 9/2003 | Mastrianni et al. ......... 709/250 |
| 6,693,894 B1 | * | 2/2004 | Andersson et al. ......... 370/352 |
| 2001/0056374 A1 | * | 12/2001 | Joao ............................ 705/14 |
| 2003/0055912 A1 | * | 3/2003 | Martin et al. ............... 709/218 |

FOREIGN PATENT DOCUMENTS

| | | |
|---|---|---|
| EP | 0 886 228 A2 | 12/1998 |
| GB | 2 330 502 A | 4/1999 |

(Continued)

OTHER PUBLICATIONS

International Search Report.

(Continued)

*Primary Examiner*—Congvan Tran
(74) *Attorney, Agent, or Firm*—Antonelli, Terry, Stout and Kraus, LLP.

(57) ABSTRACT

A system comprising at least one terminal and a server in radio communication therewith. The terminal comprises a transceiver, arranged to send radio packets to and receive radio packets from the server, and a browser application for displaying content, arranged to initiate a first application by accessing a first item associated with the first application using a first content identifier. The application is provided by the combination of the first item and further items each of which is accessible using an individual content identifier, and each of which comprises content or means for linking to content. The terminal further comprises a user interface connected to the browser having a display for displaying content and user input means. The server has a transceiver for sending and receiving radio packets from the terminal and a storage for storing content, accessible for transfer to the terminal.

42 Claims, 8 Drawing Sheets

FOREIGN PATENT DOCUMENTS

| WO | 98/58332 | 12/1998 |
|---|---|---|
| WO | WO 9858332 A1 * | 12/1998 |
| WO | 98/33293 | 7/1999 |

OTHER PUBLICATIONS

European Search Report.

Liljeberg, et al.; "Optimizing World-Wide Web for Weakly Connected Mobile Workstations: An Indirect Approach", International Workshop on Services in Distributed and Networked Environments; Jun. 5, 1995; pps. 132-139.

WAP White Paper; © AU-System Radio; Feb. 1999; ". . . When time is of the essence"; pps. 1-22.

WAP Architecture; Version 30; Apr. 1998; "Wireless Application Protocol Architecture Specification"; pps 1-20.

* cited by examiner

US 6,985,754 B1

RADIO TERMINAL FOR BROWSING THE INTERNET

FIELD OF THE INVENTION

The present invention relates to a radio terminal for browsing the Internet. It particularly relates to increasing the functionality of such a terminal by transferring content from a server.

DESCRIPTION OF THE PRIOR ART

Mobile phones are becoming widely used as they provide security, mobility and flexibility. Recently the popularity of the Internet has increased among the general population. The Internet can be browsed using a so-called browser application, which provides an easily usable visual interface. It would be particularly desirable to combine the hand held nature of a mobile phone and its associated portability with the ability to browse the Internet. The wireless application protocol (WAP) has been developed with this purpose in mind. It allows a radio handset to communicate with a transceiver at an internet gateway and accesses the internet through a radio link. A Wireless Application Environment which forms a upper layer of the WAP stack includes a microbrowser. The browser uses wireless mark-up language (WML), a lightweight mark-up language, and WML Script, a lightweight scripting language. WML implements a card and deck metaphor. The interaction of the browser and user is described in a set of cards which are grouped together into a document commonly referred to as a deck. The user navigates to a card in a deck, reviews its content and then navigates to another card in the same deck or in a different deck. Decks of cards are transferred from origin servers as needed.

A desktop computer or the like, has until now been the standard device for accessing the World Wide Web. The computer generally has a display, a cursor control and selecting device such as a mouse and a keyboard. When using a device to browse the World Wide Web, the device generally exchanges information with the Internet gateway over a fixed high band-width link. The device acts as a client and the Internet as a server. The browser can access an 'item' of content using a URL. This item allows access to further items of content each of which comprises content or means for linking to content. Typically content is downloaded from the internet to the device to allow a browser application in the device to display one page having a number of icons which are 'active'. Choosing and selecting an icon using the cursor control and selection device activates a 'link' to another defined page. The browser application requests this page from the Internet gateway acting as server. Content downloaded from the Internet to the device allows the browser application to display the page, which has been linked to. This page may in turn display 'active' icons for uses selection. The browser application mediates between the user and the Internet. It sends requests to the Internet and receives content therefrom.

The content received from the Internet may be instructions allowing the browser application to recreate a page with the correct links. It may, however, be content which cannot be processed by the browser application but which requires a separate different application such as an email application, a news reading application, etc. Portable terminals and hand held devices in particular have limited processing and memory resources. It is desirable to maximise their resources by integrating these applications with the browser without significantly increasing the complexity of the browser application itself. Such integration may require modification of the Wireless Application Protocol and in particular modification of WML and/or WMLScript.

It would be desirable to use a browser to provide the functionality of additional applications in a portable terminal by communicating over a radio link with a server while maintaining the simple functionality of the browser. For example it would be desirable to provide email or news applications via the browser in a simple manner.

SUMMARY OF THE INVENTION

According to one aspect of the present invention there is provided a system comprising at least one terminal and a server in radio communication therewith, the at least one terminalincluding:

a transceiver arranged to send radio packets to and receive radio packets from the server;

a browser application for displaying content, arranged to initiate a first application by accessing a first item associated with the first application using a first content identifier, the first application being provided by the combination of the first item and further items each of which is accessible using an individual content identifier, and each of which comprises content or means for linking to content; and a user interface connected to the browser application having a display for displaying content and user input means, the server having a transceiver for sending and receiving radio packets from the terminal and storage means for storing content, accessible for transfer to the terminal, the stored content comprising the first item accessible using the first content identifier and the further items, each of which is accessible using their individual content identifiers, and each of which comprises content or means for linking to content, the first item on transfer to the terminal including:

identifying means for identifying to the browser application the content identifiers of the further items; and link means for automatically providing a link from the first item to each of a plurality of further items, each link using an individual content identifier; and wherein activation of the links provides for access to the further items and thereby a functionality of the first application, wherein the server is arranged to asynchronously transfer the first item to the terminal.

According to another aspect of the present invention there is provided a system comprising at least one terminal and a server in radio communication therewith, the terminalincluding:

a receiver arranged to receive radio packets from the server;

a memory;

a browser application for displaying content, arranged to initiate a first application by reading a first item associated with the first application from the memory using a first content identifier, the first application being provided by the combination of the first item and further items each of which is accessible from the memory using an individual content identifier, and each of which comprises content or means for linking to content; and a user interface connected to the browser application having a display for displaying content and user input means, the server having a transmitter for sending radio packets to the terminal and storage means for storing content, accessible for transfer to the terminal, the stored content comprising the first item and the further items, the first item on transfer to the terminalincluding:

identifying means for identifying to the browser application the content identifiers of the further items; and link means for automatically providing a link from the first item to each of a plurality of further items, each link using an individual content identifier, wherein activation of the links provides for access to the further items and thereby the functionality of the first application, wherein the server is arranged to asynchronously transfer the combination of first and further items to the terminal.

According to a further aspect of the present invention there is provided a server for providing and updating a first application on a terminal via radio communication, comprising:

a transceiver for sending and receiving radio packets from the terminal and a storage for storing content, accessible for transfer to the terminal, the stored content comprising a first item accessible using the first content identifier and further items, each of which is accessible using their individual content identifiers, and each of which comprises content or means for linking to content, the first itemincluding:

identifying means for identifying to the browser application the content identifiers of the further items; and link means for automatically providing a link from the first item to each of a plurality of further items, each link using an individual content identifier, wherein activation of the links provides for access to the further items and thereby a functionality of the first application, wherein the server is arranged to asynchronously transfer the first item to the terminal.

According to a still further aspect of the present invention there is provided a method of providing functionality of an application in a browser of a terminal by creating a hierarchy of inter-linked items by transferring the items over a radio link from a server, wherein entrance to said hierarchy is through a first item, accessible through the browser using a first content identifier, the first item identifying further items in the hierarchy accessible through the browser using content identifiers and providing for links to the further items using the content identifiers, comprising the steps of:

initiating the application in the terminal by accessing the first item using its content identifier through the browser;

transferring the first item from the server to the terminal;

using the content identifiers of the further items in the first item to transfer the further items from the server to the terminal; and creating links between the first item and the further items; whereby a functionality of the application arises from activation of the links.

BRIEF DESCRIPTION OF THE DRAWINGS

For a better understanding of the present invention and to understand how the same may be brought into effect reference will now be made by way of example only to the accompanying drawings in which.

DESCRIPTION OF THE PREFERRED EMBODIMENT

Figure 1:
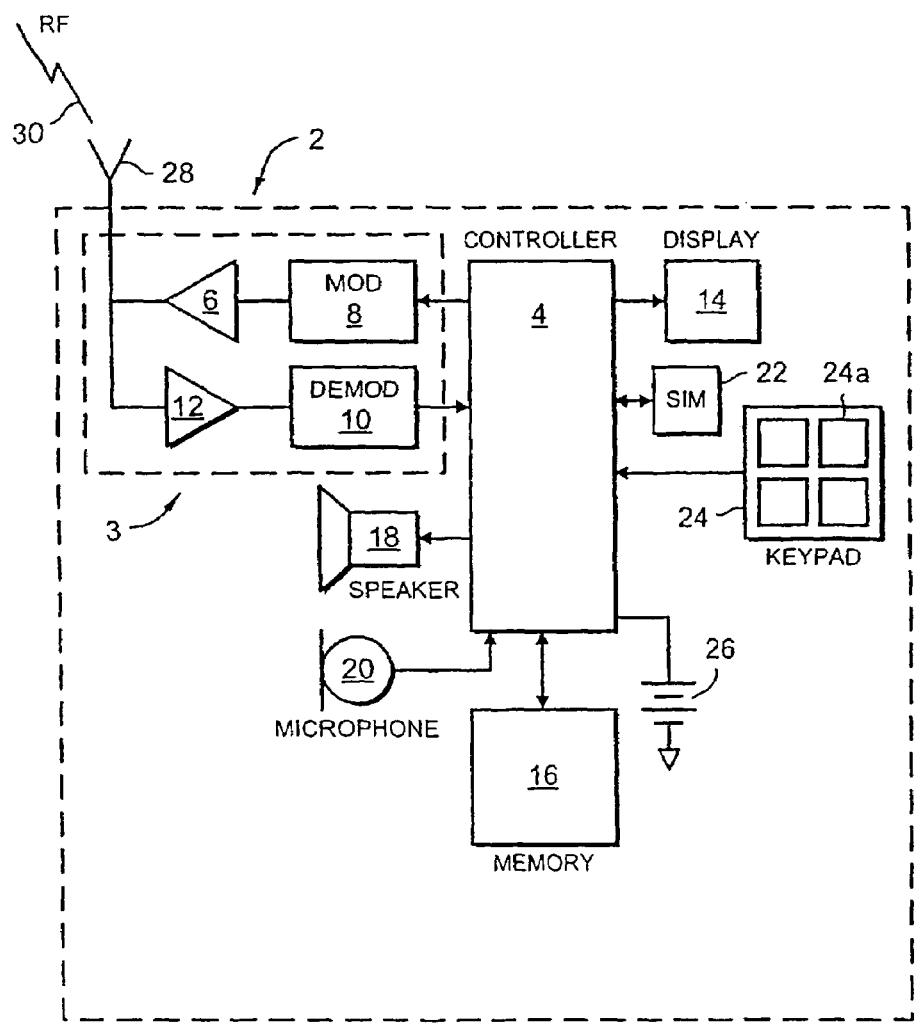
FIGS. 1 and 2 schematically illustrate a radio handset.
Figure 2:
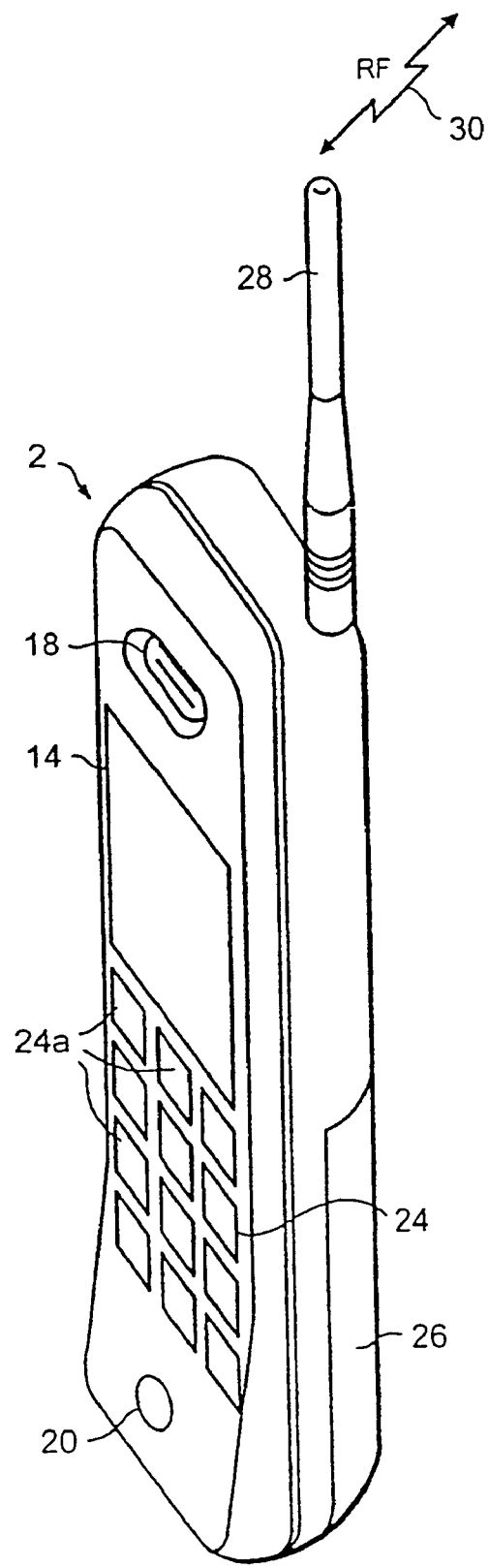

FIGS. 1 and 2 illustrate a hand-portable radio communications device, henceforth referred to as a terminal or radio handset 2. The terminal 2 is small enough to be carried by hand and is preferably sized to fit into a pocket of a jacket. The terminal communicates with other terminals or devices using radio waves.

The terminal 2 has a user interface comprising, for input, a keypad 24 having keys 24a and a microphone 20 and, for output, a speaker 18 and a display 14. The size of keypad 24 and display 14 are necessarily limited by the size of the terminal 2. The terminal 2 is controlled by controller 4 and is powered by battery 26. The controller 4 receives signals from the microphone 20 and the keypad 24 and provides signals to the display 14 and the speaker 18. The terminal 2 has a transceiver 3, which is used to communicate outside the terminal 2. The transceiver 3 is a radio frequency transceiver connected to an antenna 28 and controller 4. It is arranged to communicate via a radio frequency interface 30. The transceiver 3 includes a modulator 8 for modulating signals received from the controller 4 and a transmitter 6, which presents the modulated signals to the antenna 28. The transceiver 3 also includes a receiver 12 which processes signals received at the antenna 28 and provides them to a demodulator 10 which provides demodulated signals to the controller 4. The terminal 2 has a memory 16 which is connected to the controller 4 via a bus. The terminal also has a SIM memory 22 connected to the controller 4 which provides information allowing the terminal 2 to function as a mobile phone. When functioning as a mobile phone, the terminal 2 transmits and receives radio frequency signals via the antenna 28. The fundamental functions of the terminal 2 are provided by the combination of the controller 4 and the memory 16.

The terminal 2 has a number of fundamental capabilities including system capabilities relating to radio communication. The terminal when functioning as a phone will use standard communication protocols such as GSM, AMPS etc and when functioning as an internet terminal will use the wireless applications protocol (WAP). The WAP protocol provides for a web browser.

Figure 3:
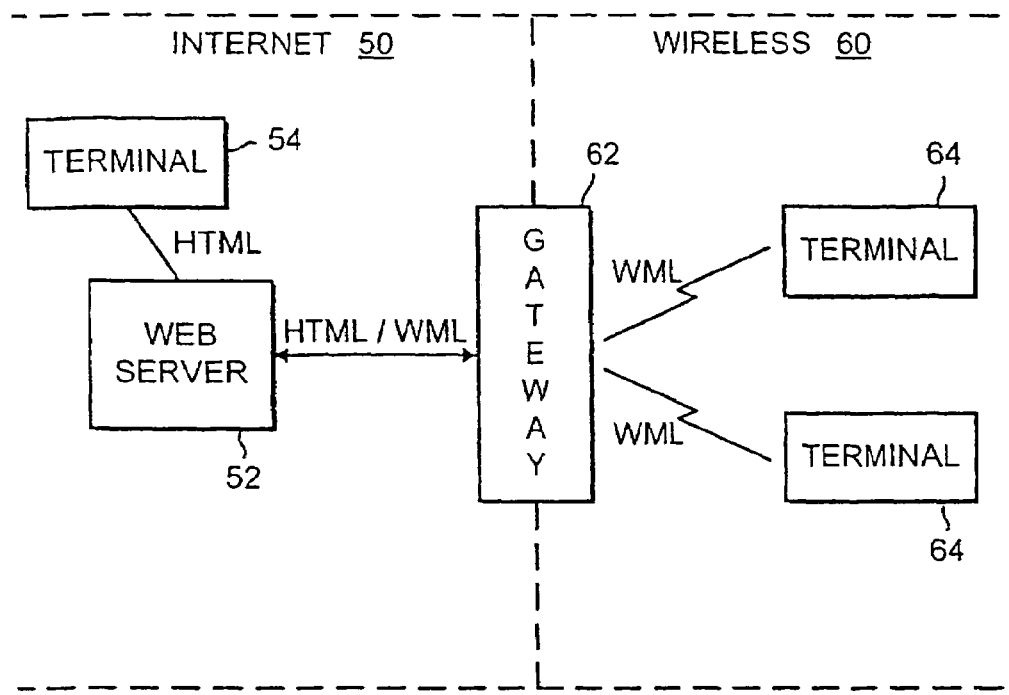
FIG. 3 illustrates a network for accessing the Internet.

FIG. 3 illustrates an Internet network 50 and a wireless network 60. The Internet network comprises a web server 52 and a plurality of Internet station (terminal) 54, which are clients to the web server 52. The Internet network uses World Wide Web (WWW) protocols. The wireless network 60 includes a plurality of wireless terminals 64, each of which can access the web server 52 via a protocol gateway 62. These terminals are preferably hand-portable radio handsets. Communication between a wireless terminal 64 and the protocol gateway 62 is according to the Wireless Application Protocol (WAP). WAP specifies an application framework and network protocols for wireless terminals such as mobile telephones, pagers and personal digital assistants. WAP brings Internet content and advanced data services to wireless terminals. WAP can work across differing wireless network technologies and bearer types (GSM, CDMA, SMS). Communication between the web server 52 and protocol gateway 62 is according to WWW protocols.

The wireless terminal differs from the Internet station in that generally it has a less powerful CPU, less memory, restricted power consumption, smaller displays and more limited input devices. The wireless network differs from the Internet network in that generally it has less bandwidth, more latency, less connection stability and less predictable availability. The WAP architecture is optimised for narrow bandwidth bearers with potentially high latency and is optimised for efficient use of device resources.

Each device in a network is capable of sending and receiving packets of information. A device may according to context be a server or a client, and a server may service a number of clients while being a client to another server. Devices include the web server 52, the Internet stations 54, the wireless terminals 64 and the protocol gateway 62. A wireless terminal 64 acts as client and initiates a request for a connection with an origin server, the web server 52, to access a resource. The resource, identified by a URL (Uniform Resource Locator), is data (content) stored or generated at an origin server 52. The content is typically displayed or interpreted by the client. The protocol gateway translates requests from the WAP protocol stack used by the wireless terminal 64 to the WWW (World Wide Web) protocol stack used by the web server. The web server either returns WAP content such as WML (Wireless Markup Language) or WWW content such as HTML (HyperText Markup Language). In the later case a filter is used to translate the WWW content to WAP content for example HTML to WML. The protocol gateway also encodes content sent over the wireless network to the wireless terminal and decodes data sent to it by the wireless terminal.

WAP defines a set of standard protocols that enable communication between mobile terminals and network servers. WAP uses a standard naming model according to which standard Internet URLs are used to identify content on origin servers. It also uses content typing. All WAP content is given a specific type consistent with WWW typing which allows a wireless terminal to correctly process the content based on type. WAP also uses standard content formats and standard communication protocols.

A Wireless Application Environment which forms a upper layer of the WAP stack includes a microbrowser. The browser uses wireless markup language (WML) and a lightweight markup language, WMLScript a lightweight scripting language. Embodiments of the present invention provide the functionality of additional applications, for example email applications or news reader applications by creating extensions to WML and WMLScript. This allows the processing power of the terminal to be restricted, allows a standard WAP browser to be used and provides flexibility for new features.

Figure 4:
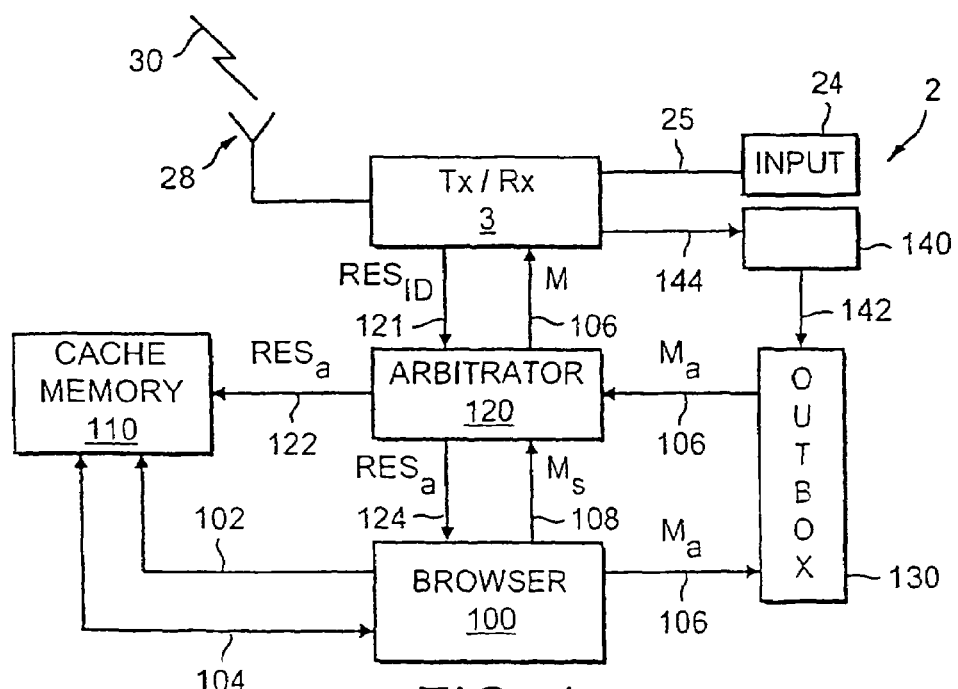
FIG. 4 is a schematic representation of the operation of a browser application in a terminal according to a first embodiment.

FIG. 4 is a schematic illustration of the operation of a browser application 100 in a terminal 2. The browser application provides the normal browsing functions provided by WAP up until this time but in addition provides other additional functions through the browser application such as email applications and news reading applications. The additional applications are provided by transferring content to the terminal. The content provides a hierarchy of decks which is used by the browser to emulate an additional application. The "master copy" of the content for emulating the additional application in the browser is stored and retained in the server. Any update or change to the content in the browser occurring during the use of the additional application must be communicated to the server so that the "master copy" of the content can be updated.

FIG. 4 includes the antenna 28 which communicates over the interface 30 with the transceiver 3, the browser application 100, a cache memory 110 which may be part of the controller 4 or memory 16 in FIG. 1, an arbitrator 120, an outbox 130, an outbox controller 140 and the input 24.

The transceiver 3 receives messages from the arbitrator 120 for transmission over the interface 30 and supplies messages 121 received over the interface 30 to the arbitrator 120. The arbitrator 120 determines whether a received message is in response to a request from the browser (synchronous) or is not in response to a request from the browser but pushed from the server over interface 30 (asynchronous). An identifier in the messages transmitted over the interface 30 identifies whether the received messages are synchronous or asynchronous. The arbitrator 120 determines from the identifier whether a received message is synchronous or asynchronous and directs the received asynchronous messages 122 to the cache memory 110 and directs the received synchronous messages 124 to the browser 100. The browser 100 on receiving a message 124 accesses and responds to its content, it then sends the content 102 to the cache memory 110 where it is stored such that it can be accessed using the content's URL. The content in the received asynchronous message is stored in the cache memory 110 such that it can be accessed using the content's URL. The cache is unitary and is not partitioned. The content stored in the cache is not stored in different segments depending on the application it relates to. The content for all applications is stored in the undivided cache. This may be on a first in first out basis or alternatively the content could have different priorities with the order of deletion of the content from the memory being dependent upon the priorities.

In the browser application URLs are used to access content. First the browser attempts to access the content in the cache 110 using the correct URL. If the content is stored in the cache it is read 104 from the cache into the browser. If the content is not in the cache, the read is unsuccessful and the browser synchronously requests the content from the server over the interface 30. The browser creates a message 108 containing the required content's URL and sends the message to the server over the interface 30. The browser then waits for a synchronous reply message 124 containing the required content to be returned by the server over the interface 30 and directed by the arbitrator 120 to the browser 110. The browser then responds to the received content. The server can provide push content to the terminal asynchronously without the content being requested. The arbitrator 120 directs this received content to the cache 110 where it can be accessed by the browser at a later time.

The browser 100 when emulating an application, can modify the "master copy" of the content stored in the server. This "master copy" is transferred in whole or in part to the terminal to emulate the application. The modification is effected by sending asynchronous messages 106 from the browser to the server. The messages are sent from the browser 100 to the outbox 130. The outbox 130, under the control of the enable/disable signal 142 provided by the outbox controller 140, can send the messages to the server via the interface 30. When the outbox controller 140 disables the outbox 130, the outbox buffers the messages 106. When the outbox controller 140 enables the outbox 140, the outbox 130 empties automatically and continues to empty automatically until disabled. When the outbox empties the messages stored there are transferred to the transceiver for transmission. The outbox controller 140 receives a input control signal 144 from the transceiver 3. This signal controls whether the controller 140 enables or disables the outbox 130. When the transceiver is able to communicate with the server over the interface 30, the input control signal 144 enables the outbox 130. When the transceiver is unable to communicate with the server over the interface 30, for example because the transceiver is disabled, the terminal is out of radio coverage of the server or the radio interface between the server and terminal is degraded, then the input control signal 144 disables the outbox 130 and the asynchronous messages 106 are buffered. The outbox can be controlled by adding new library calls to existing WML Script functionality.

The input 24 when activated provides a signal which disables the transceiver 3: Disablement of the transceiver prevents communication over the interface 30 but does not otherwise affect the terminal. Thus the browser application may be used in situations where radio transmission is undesirable for example on an airplane. In particular it may be used to access the additional functions provided by the browser, for example, off-line email reading and composing, re-plying to previously received emails and off-line news reading. The actions undertaken while off-line which affect the "master copy" of the content used for emulating the active application(s) in the browser are stored as messages 106 in the outbox 130 and sent when the terminal comes on-line again.

Figure 5A:
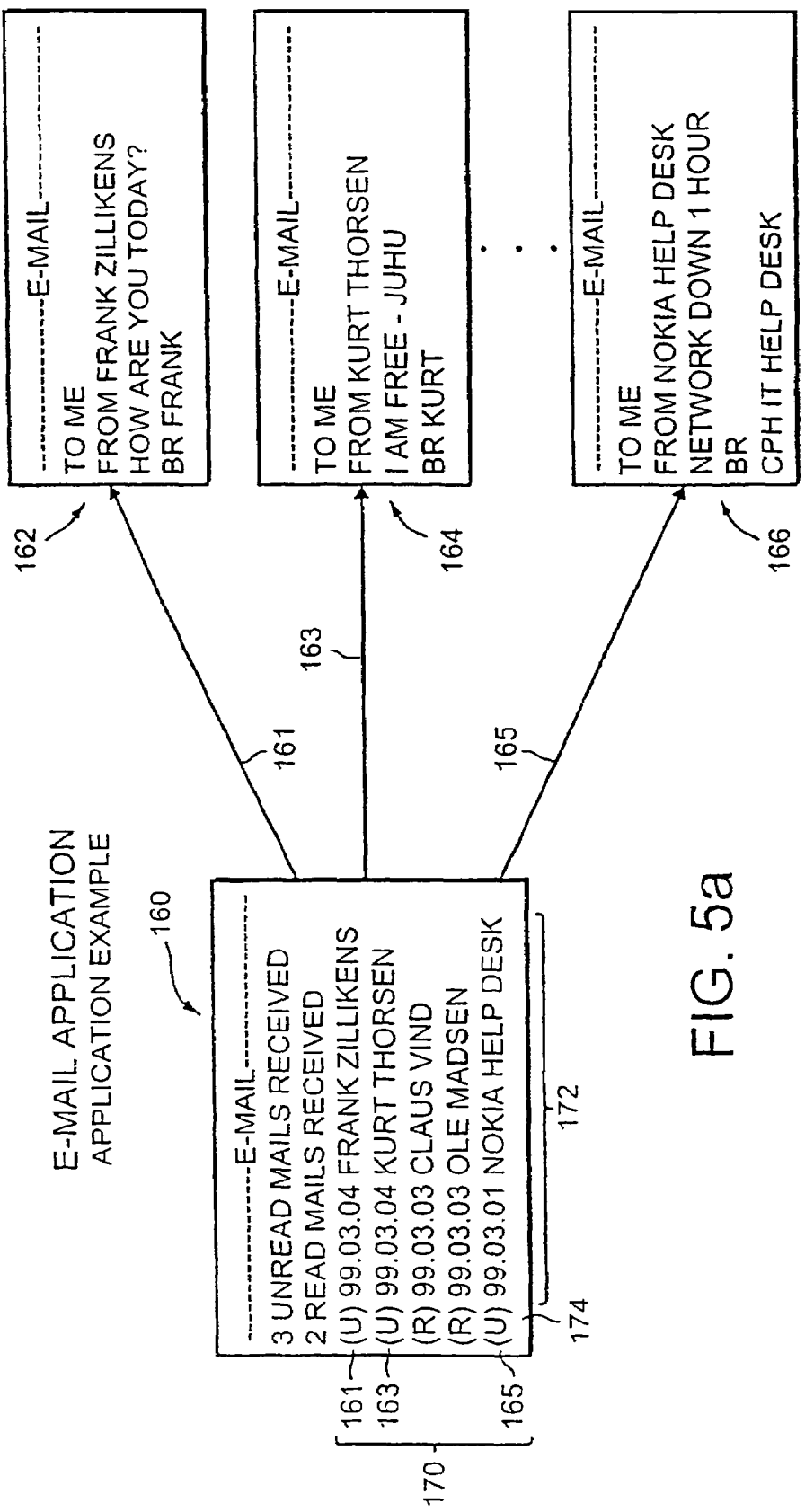
FIGS. 5a and 5b illustrate the hierarchy of items used to provide an email application and a news reading application respectively.

FIG. 5a illustrates a hierarchy of inter-linked items each of which contains content. The combination of items is used to emulate an application in a browser of a terminal. The items are stored in the server as a "master copy" and are transferable to a terminal to emulate an application. The items are maintained in the server and transferred to the terminal over the interface as and when necessary. Although the items may be modified by using the browser, the items maintained in the server must be brought into conformity with any such modifications.

In the example shown, the items in combination provide the functionality of an email application. A first item 160 provides user selectable links 161, 163, 165 to respective further items 162, 164 and 166. The item 160 and each of the further items 162 are each created from a deck. In this example the first item provides on the terminal display a list 170 of user selectable links 161, 163 . . . 165 each of which represents an email. Selection of a link accesses the appropriate further item and displays the text of an email on the display. Each of the links has two portions. A first text portion 172 gives a description of the link, in this case the date and author of each email, and a second text portion 174 gives a visual indication of a parameter associated with that link. In this case the parameter indicates whether a link has previously been activated (R) to read the email or not activated (U). It is apparent therefore that operation of the application may change the content received at the browser for example changing the parameter from indicating U to R. The browser will update the items in the server to reflect the modifications using the asynchronous messages 106.

Typically the email application would be accessed through a bookmark list in the browser which lists a number of favorite internet pages and the email application. Each of the entries has an associated URL and selecting an entry in a bookmark list causes the browser to access the content associated with the URL. The cache 110 will be accessed first and if the content is not present a request will be made over the interface 30 to the server. The email application entry in the bookmark list is associated with the URL of the first item (the deck) 160. Accessing the first item 160 automatically provides the means for accessing the remaining further items which provide the email application. The further items are accessed by reading them from the cache and if this is unsuccessful by transferring them over the interface 30.

Figure 5B:
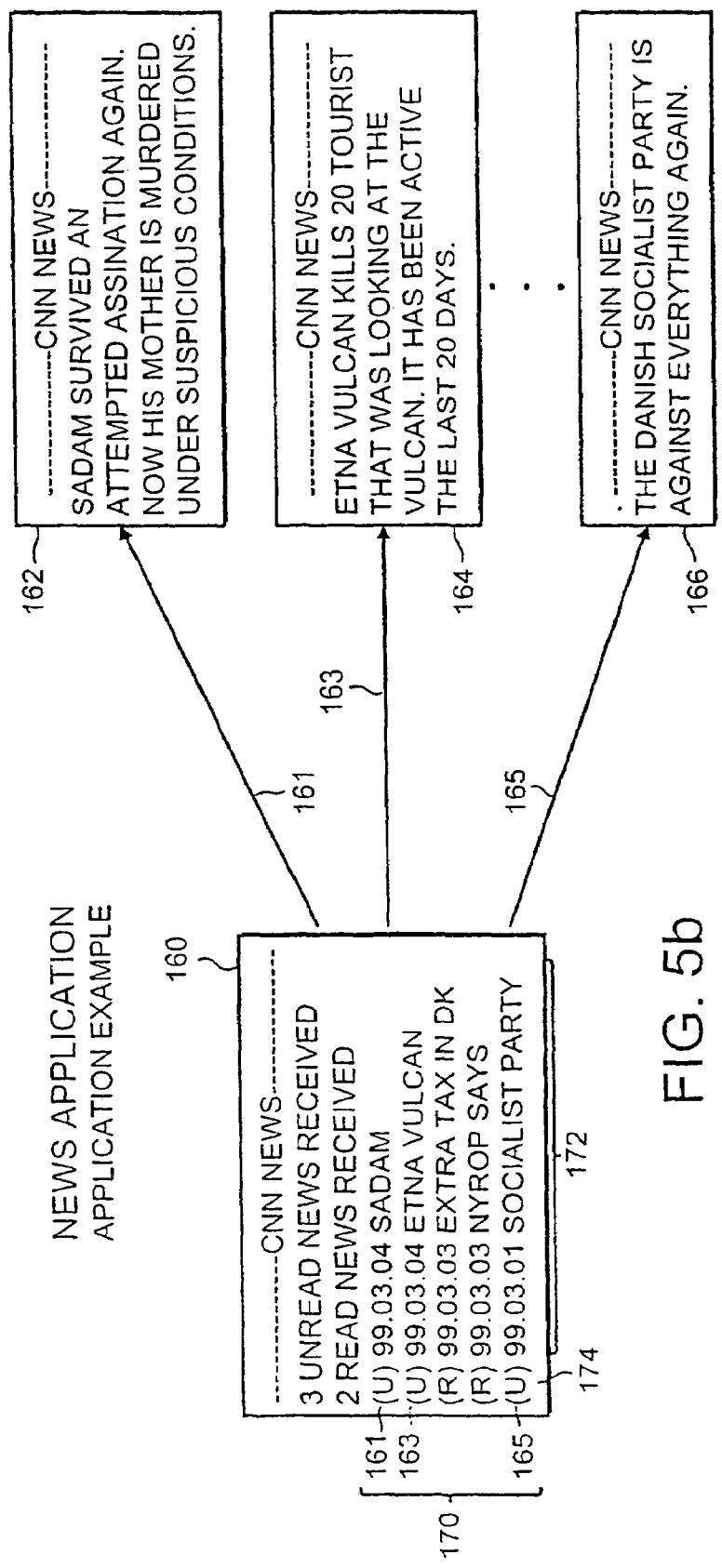

FIG. 5b is similar to FIG. 5a and illustrates a hierarchy of items containing content. The items in combination provide the functionality of a news reader application. As previously a first item 160 provides user selectable links 161, 163, 165 to respective further items 162, 164 and 166. The item 160 and each of the further items 162 are each created from a so-called deck in WAP. In this example the first item provides on the terminal display a list 170 of user selectable links 161, 163 . . . 165 each of which represents a news piece. Selection of a link accesses the appropriate further item and displays the text of the news piece on the display. Each of the links has two portions. A first text portion 172 gives a description of the link, in this case the date and news headline of each news piece, and a second text portion 174 gives a visual indication of a parameter associated with that link. In this case the parameter indicates whether a link has previously been activated (R) to read the news piece or not activated (U).

Figure 6:
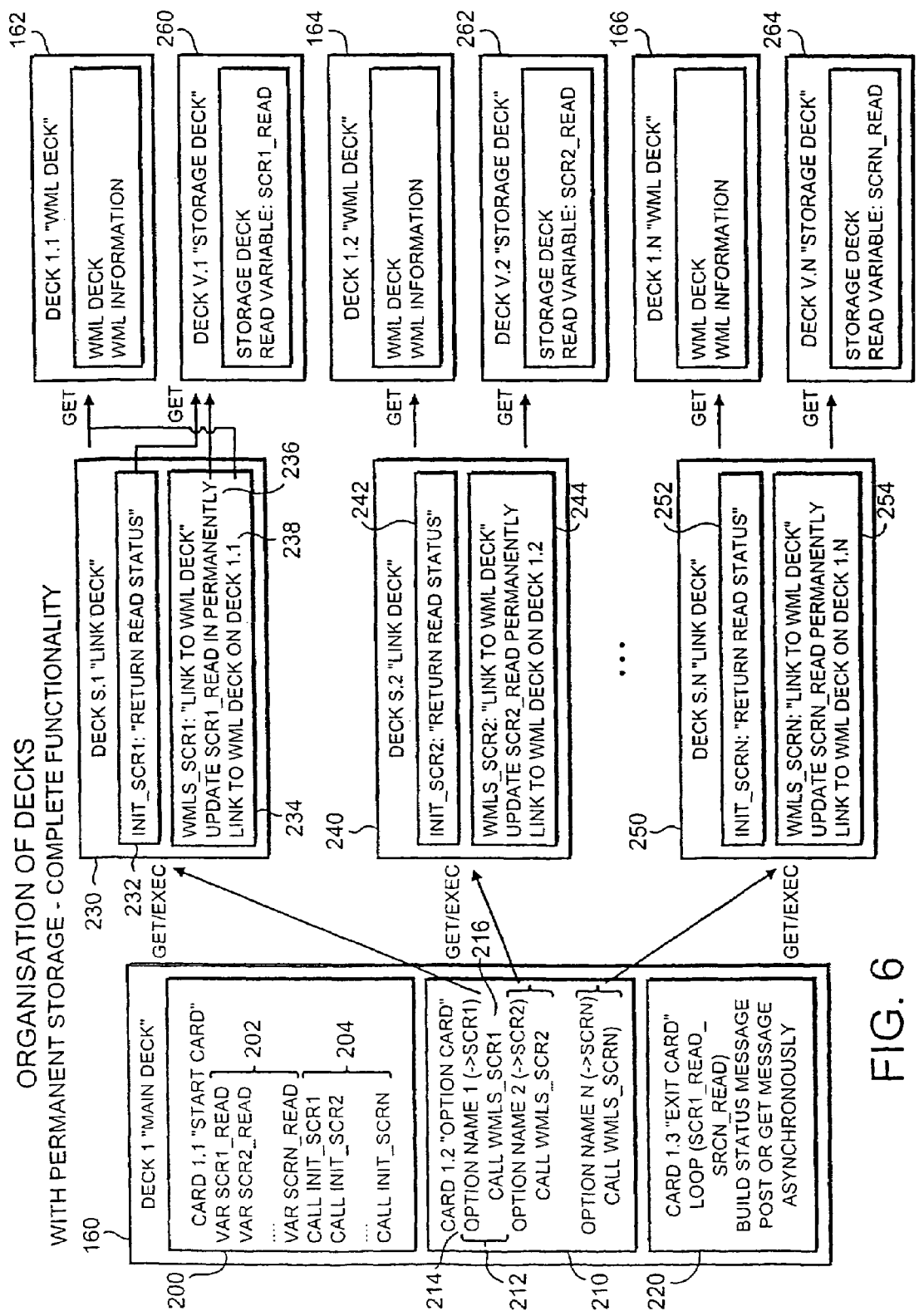
FIG. 6 illustrates the items in a hierarchy in more detail.

FIG. 6 illustrates the hierarchy of content items which co-operate to provide the functionality of an additional application to the browser. The "master copy" of this content is stored on the server. Each of the content items has an individual URL and can be accessed by the browser using the URL. Access in this context means that if the item is stored in the cache it will be read from the cache using its URL and processed in the browser, and if the item is not stored in the cache, the browser will request the item using its URL from the server over the interface 30. The first item 160 is a deck called the Main deck and it identifies the other items and their URLs to the browser. The Main Deck 160 is accessed by first getting the Main Deck's URL. If the Main Deck is stored in the cache the URL will be used to load the Main Deck from the cache, otherwise the browser requests the deck from the server over the interface 30 using the URL. The Main Deck's URL may be obtained by selecting a bookmark in the browser application which is associated with the URL of the Main Deck or by reading the URL from a SIM on which the Main Deck's URL is stored. Thus, operators could pre-program SIM cards before release with the URL's for the additional applications they support.

The Main Deck 160 comprises three cards: the Start Card 200, the Option Card 210 and the Exit Card 220. Each of the cards has an individual URL. When the Main deck is loaded into the browser the Start Card is automatically activated. The start card has a first portion 202 which defines a number of parameters (SCR1, SCR2, SCR3) each of which is assigned a value reflecting the value of the parameter in the "master copy" of the content stored in the server. The second portion 204 of the Start Card 200 updates the parameter values to reflect the value of the parameters stored locally in the terminal. As will become clear in the following, the second portion 204 sequentially effects access to the items (Link Decks) 230, 240 and 250 which form the next level in the hierarchy, each of which respectively effects access to the items (Storage Decks) 260, 262 and 264. Thus portion 204 ensures that the Link Decks and Storage Decks are loaded into the cache from the server if not already there.

The Option card 210 is entered on reaching the end of the Start Card 200. The option card has a number of portions 212, each of which is associated with a defined one of the Link Decks 230, 240, 250 in the second layer of hierarchy. On entering the Option Card the portions are automatically activated sequentially creating user selectable links 161, 163 etc on the display of the terminal. On activation of each portion 212 a first function call 214 automatically provides the text/indicia on the display indicating the presence of the user selectable link 161 and a second function call 216 automatically creates a user actuated link 161 to a defined content item in one of the Link Decks 230 in the second layer of the hierarchy. The first function call 214 provides the first text portion 172 and the second text portion or indicia 174 on the screen. The text portion or indicia 174 is dependent upon the local value of a parameter assigned in the second portion 204 of the Start Card 200. The links created by the second functions 216 are activated by the user selecting the link 161 displayed. Activation by the user causes the browser to access the defined content item in the second layer of hierarchy. The browser first tries to load the content item from the cache and if unsuccessful requests its transfer from the server.

The Exit Card is accessed when the application entered through the Main Deck 160 and represented by the hierarchy of content items in FIG. 6 is exited. The exit card controls the creation of the asynchronous messages 106 which are sent to the outbox, and ensures that the "master copy" of the content items stored in the server representing the application are updated to reflect any modifications effected by the browser.

The Link Deck 230 comprises a first card 232 and a second card 234. The deck is called a link deck as each provides for access from the Main Deck 160 to a pair of further items in the third level of hierarchy, namely a WML Deck which is a deck comprising content such as an email or news piece, and a Storage Deck which is a deck storing parameters associated with the WML Deck in the pair such as where the email or news piece has been read. The Link Deck 230 provides for access from the Main Deck 160 to the WML Deck 162 and the Storage Deck 260. The link deck 240 provides for access from the Main Deck 160 to the WML Deck 164 and the Storage Deck 262. The link deck 250 provides for access from the Main Deck 160 to the WML Deck 166 and the Storage Deck 264.

In the link deck 230, the first card 232 is accessed when the function Call Init_SCR1 in the second portion 204 of the Start Card 200 is activated. The browser attempts to access the card 232 using its URL from the cache, if it is unsuccessful, the browser requests the transfer of the deck 230 comprising card 232 from the server. Once the card 232 has been accessed Init_SCR1 in card 232 is activated which accesses the storage deck 260 using its URL and returns the parameter value(s) stored therein as SCR1. The storage deck is accessed by first reading the cache using its URL and then if necessary requesting the transfer of the storage deck 260 from the server using its URL. Thus the function Call Init_SCR1 ensures the link deck 230 and storage deck 260 are stored locally in the cache and accesses the parameter value(s) stored in the Storage Deck.

In the link deck 230, the second card 234 is accessed when the second function call 216 of a portion 212 of the Option Card 210 is activated by selection of a link 161 by a user. The browser accesses the second card 234 by attempting to read the second card 234 from the cache 110 using its individual URL and if it is unsuccessful by requesting transfer of the deck 230 from the server. When the second card 234 is accessed, two functions are carried out. First, the browser accesses the storage deck 260 and updates the stored parameters there to indicate that the link provided by the link deck 230 has been activated. This in the examples given previously, the content in the storage deck 260 will adapt so that the value SCR1 will create a symbol R as opposed to U on the screen when the first function call 214 of portion 212 in the Option Card creates the text/indicia 174 on the display. Second, the browser accesses the deck 162 and processes the content therein. This access in the previous examples displays the text of an email or a news piece. As previously when the browser accesses an item it uses the item's URL to attempt to read the item from the cache and if this is unsuccessful requests the transfer of the item from the server.

It should be appreciated that loading the Main Deck into the browser automatically provides means for creating the hierarchy of items within the terminal. The first portion 202 of the Start Card 200 brings the parameter values into line with the "master values" in the server. The second portion 204 of the Start Card 200 brings the parameter values into line with those stored locally in Storage Decks within the cache and transfers any Storage Decks or Link Decks from the server to the terminal which are not in the terminal's cache. Each portion 212 of the Option Card 210 creates a user selectable link and indicates the link on the display. The indication identifies whether the link has previously been activated which fact is derived from one of the parameter values.

The deck 162 when loaded in the browser creates a text message and a number of links which the user can use to return to the first level of hierarchy of the application or to leave the application altogether. A back option provides a link to the Main Deck using its URL. User selection of the link makes the browser access the Main Deck 160. The main Deck 160 is then loaded into the browser from the cache using its URL or, if necessary, from the server using its URL. An exit option provides for an exit from the application and to enter the main menu and a bookmark option allows the user to exit the application by selecting a bookmark which may represent another application or a link to other content not related to an application. User selection of the exit option or a bookmark is detected as an event in the browser and an event handler is arranged to control the subsequent action. When the exit option is selected the Exit Card is accessed using its URL before the main menu is entered. When the bookmark is selected the Exit Card is accessed using its URL before the content identified by the bookmark is accessed. When accessing the Exit Card 220, the browser first attempts to read the Exit Card from the cache 110 using its URL and if unsuccessful requests transfer of the Main Deck from the server and then reads the Exit Card 220.

The exit card 220 is used to keep the "master records" stored in the server in line with the records stored and updated in the browser. The storage decks 260 each store parameters which may vary during an application session. For example the parameter indicating whether a mail or news piece has been read will change if the deck containing the email or news is accessed. Also a parameter may indicate that the user has chosen to delete a news piece or email. The exit card creates a message 106 which identifies the new values of the changed parameters and sends it asynchronously to the outbox 130. The message is formed by accessing the storage decks 260, 262. This involves accessing the first card 232, 242, 252 of the link decks 230, 240, 250 respectively to obtain the new parameter values SCR1, SCR2, SCR3. The storage decks are stored in the cache which is of a size such that storage decks of an active application will not be deleted in the cache before the exit card sends a message 106 to update the server. According to an alternative embodiment the storage decks are prevented from being deleted from the cache until the server has been updated.

When a user of the terminal creates new content, for example, by authoring an email, this content is sent to the server using a message 106.

When the server receives a message 106 from the terminal, it updates the "master copy" of the content. In the first example given above, it updates the values of the parameters SCR1, SCR2, SCR3 etc which have been varied by the browser and communicated to the server. The server after updating the "master copy" pushes the Main Deck 200 from the "master copy" to the terminal. The Main Deck is sent in a message with an asynchronous identifier. The terminal receives the pushed Deck and directs it for storage in the cache, The server can update the application by transferring items to the terminal after they have been requested, that is synchronously, or without them having been requested by the browser, that is asynchronously. The messages containing the items which are sent asynchronously are directed to the cache. Thus the server can update the application when appropriate, for example when it receives a new email or a new news piece.

If the terminal has a large enough cache, it would be possible to store all the items of the hierarchy needed to perform the application in the cache. The browser would not then need to request items from the server. If the browser in such a terminal was not configured to amend the content received from the server, then it is not necessary for the terminal to be able to transmit to the server. The transceiver 3 could in this case therefore be replaced by a receiver.

When the server receives a new item for the application such as a new email it: —updates the Start Card 200 of Main Deck 160 by introducing a new entry to each of first and second portions 202 and 204; updates the Option Card 210 of the Main Deck 160 by introducing a new portion 212 having first and second function calls 214 and 216; creates a new link deck having an individual URL and a first card accessible by the new entry in the second portion 204 of the Start Card 200 and a second card accessible on activating the link provided by the new portion 212 in the Option Card 210; creates new WML deck having an individual URL accessible via the second card of the link deck which stores the text of the new email; and creates a new Storage Deck having an individual URL accessible for reading from via the first card of the link deck and accessible for writing to via the second card of the link deck which stores a parameter indicating that the email is unread. The server creates a message containing the updated Main Deck and pushes it asynchronously to the terminal. As an alternative, the server may create a message for each of the new decks in the hierarchy formed and concatenate these messages and send the concatenated message asynchronously to the terminal.

The link decks de-couple the Main Deck from the WML Decks and Storage Decks. The WML Decks may be replaced without adapting the Main Deck by adapting the relevant link decks. The link decks provide a standard interface to the Main Deck while allowing the structure of the second and third levels of the hierarchy to be varied without replacing the Main Deck.

Figure 7:
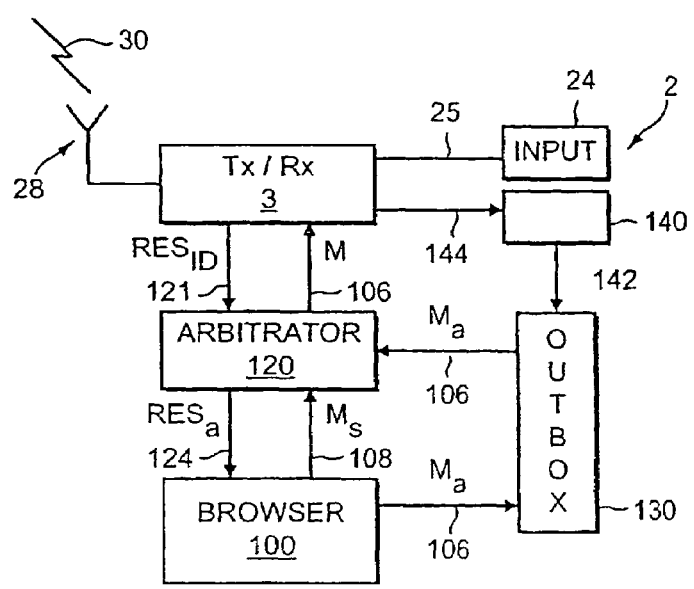
FIG. 7 is a schematic representation of a terminal according to a second embodiment.
Figure 8:
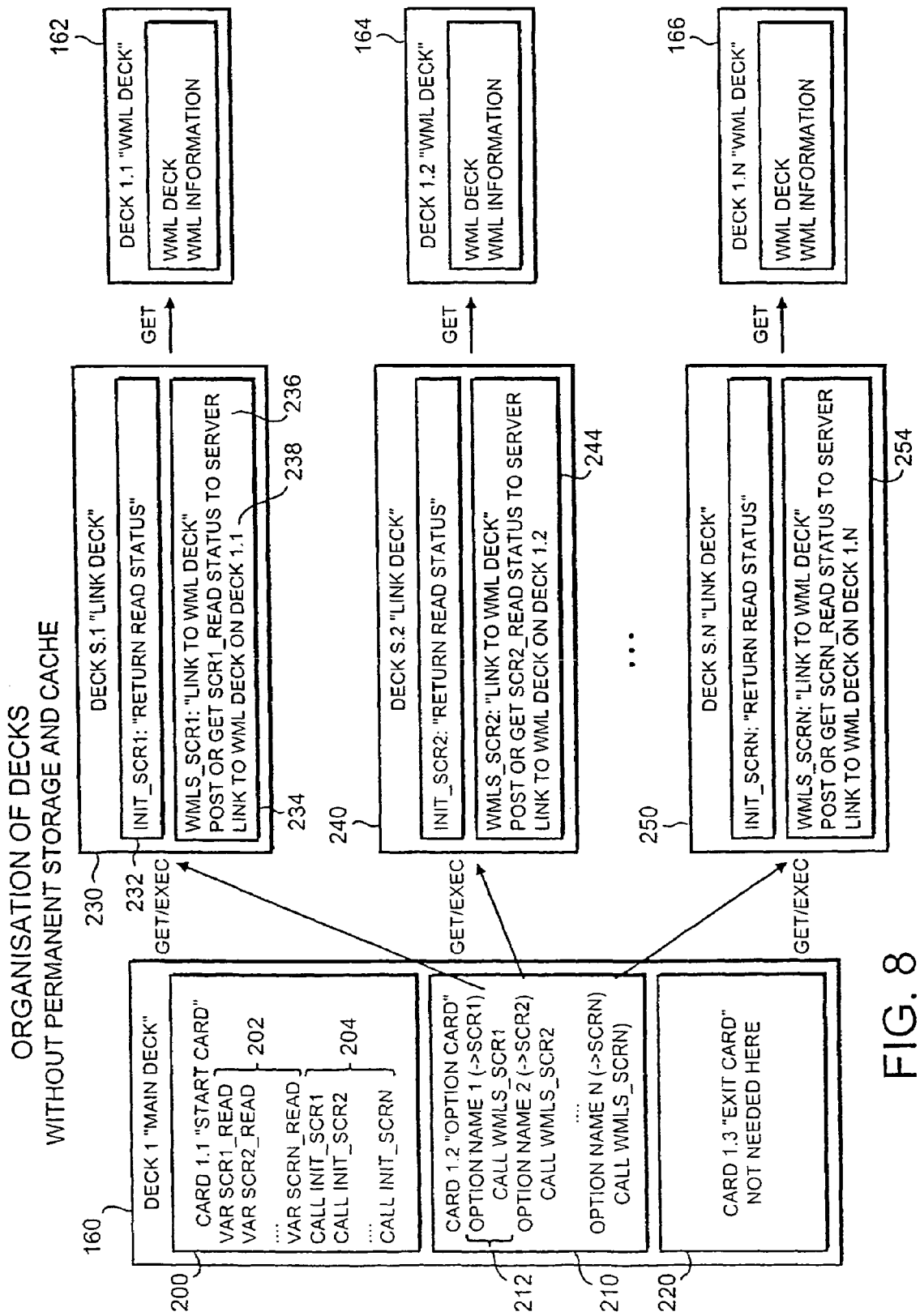
FIG. 8 illustrates an alternative hierarchy of items according to an embodiment of the invention.

FIG. 7 shows an alternative embodiment of the terminal previously described with relation to FIG. 4 and FIG. 8 shows an alternative hierarchy of decks suitable for use in the browser 100 of FIG. 7. The difference between the terminal 2 illustrated in FIG. 7 and that illustrated in FIG. 4, is that the terminal illustrated in FIG. 7 does not have a cache 110. A consequence of not having a cache is that all accesses made to items, whether decks or cards, using their URLs occurs by sending a request to the server for the relevant deck to be transferred to the terminal. Another consequence is that the application emulated by the hierarchy of decks does not have local storage as there is nowhere for the Storage Decks to be kept, thus Storage Decks are absent from FIG. 8. The terminal informs the server when an action occurs which changes a parameter. Consequently, the second cards 234', 244', 254' of the link decks have a different first function call 236', etc to that described with relation to FIG. 6. The first function call 236' of the second cards 234', 244', 254' creates an asynchronous message 106 which is placed in the outbox. This message informs the server that the relevant WML Deck has been accessed and the server responds by adapting the relevant parameter and pushing a new Main Deck. The Main Deck 160 in FIG. 8 does not require an Exit Card 220' as there is no local storage.

In addition, in a preferred embodiment of the present invention, one of the items, like decks and cards, could be arranged to give an indication, upon storage of an item in the terminal. The item will then be able to have the functionality of an inbox, providing the user with information about new updated service indications, like e-mails, news, etc. The item will hereafter be referred to as the inbox item. The service indication can comprise a name of the service, a link to a URL or URI, a number of the indication, and/or the priority of the indication. If the user would like to access a service, it should then be possible to enter the inbox item and for example choose a link. Some indications are of course more important than others. Therefore, it should be possible to organise the service indications in a simple and effective manner. One way of doing this is to let the inbox item be static and/or dynamic. This means that it could be possible to combine the inbox item to have both a static part and a dynamic part, that is some service indications could be dynamic and some could be static. It is also possible to have the whole inbox item as dynamic or static as well, which could be controlled by user.

For example, if the user receives an service indication on a regular basis, for example an indication received on an application like number of received e-mails, this could be stored permanently in the inbox item. This means that a permanent storage could be done in a static part of the inbox item, that is it could be possible to reserve and/or un-reserve a location in the item inbox to a dedicated item. Elements in the static part should be installed or removed thorough a user access from the inbox item. Also, the static part could form a list of bookmarks, together with status information of for example a number of service indications received and a URL address to the asynchronous application or a priority of user notifications.

As an alternative example, the inbox item could be dynamic, which could enable the user to delete/insert an indication an indication of an arbitrary item. When the user receives a new service indication, it can be further possible to arrange the service indications in a prioritised order, for example a First In First Out (FIFO) priority order. Naturally, the FIFO priority order could also be provided in the static part, as mentioned in the previous paragraph. If the inbox item comprises both dynamic and static parts, using a FIFO priority order, the static parts should typically have a higher priority than the dynamic parts, that is upon receiving a static part, the static part would preferably remove the dynamic part.

Any annex attached to this application forms part of the present description.

Although the invention has been described with respect to a particularly preferred embodiment, it should be appreciated that the invention as defined by the claims extends beyond the particular features of the embodiment described to encompass modifications and variations to the embodiment not necessarily described.

What is claimed is:

1. A system comprising:
   at least one terminal and a server in radio communication therewith, the at least one terminal including
   a transceiver arranged to send radio packets to and receive radio packets from the server;
   a browser application for displaying content, arranged to initiate a first application by accessing a first item associated with the first application using a first content identifier, the first application being provided by the combination of the first item and further items each of which is accessible using an individual content identifier, and each of which comprises content or means for linking to content; and
   a user interface connected to the browser application having a display for displaying content and user input means;
   the server having a transceiver for sending and receiving radio packets from the terminal
   and a storage for storing content, accessible for transfer to the terminal, the stored content comprising the first item accessible using the first content identifier and the further items, each of which is accessible using individual content identifiers, and each of which comprises content or means for linking to content, the first item on transfer to the terminal including identifying means for identifying to the browser the content identifiers of the further items; and
   link means for automatically providing a link from the first item to each of a plurality of further items, each link using an individual content identifier, and wherein activation of each link provides for access to the further items and thereby a functionality of the first application, wherein the server is arranged to asynchronously transfer the first item to the terminal.

2. A system as claimed in claim 1, wherein the first item, on transfer to the terminal, comprises transfer means for transferring the further items from the server to the terminal for storage in a memory in the terminal where the further items may be accessed using individual content identifiers.

3. A system as claimed in claim 1, wherein the link means of the first item additionally has means for providing a visual indication of the link on the display and for providing for user activation of a displayed link.

4. A system as claimed in claim 1, wherein access to the first item and further items by the browser includes attempting to read the item from a memory in the terminal and then, if unsuccessful, requesting transfer of the item from the server by sending a radio packet containing the appropriate content identifier and receiving in reply a radio packet or radio packets containing the item.

5. A system as claimed in claim 1, wherein a content identifier is a URL.

6. A system as claimed in claim 2, wherein the transfer means transfers only those items which are not already stored locally.

7. A system as claimed in claim 2, wherein on transfer of the first item to the terminal, the identifying means, the link means and the transfer means are activatable to establish a hierarchy of items.

8. A system as claimed in claim 7 wherein the identifying means, the link means and the transfer means are activated automatically when the first item is transferred.

9. A system as claimed in claim 1, wherein the browser application may be updated by updating the identifying means and the link means of the first item in the server and transferring the updated first item to the terminal.

10. A system as claimed in claim 1, wherein the browser application may be updated by updating the content of further items in the server and transferring the updated items to the terminal.

11. A system as claimed in claim 1, wherein on the first activation of the first application, all items associated with an application are transferred from the server to the terminal.

12. A system as claimed in claim 1, wherein communication between the terminal and server is in accordance with the Wireless Application Protocol and the first item is a deck and the further items are either cards or decks.

13. A system as claimed in claim 1, wherein the terminal comprises arbitration means for determining whether an item received from the server is in reply to a request for access by the browser application and should be directed to the browser application or is not in reply to a request for access by the browser application and should be directed to local storage.

14. A system as claimed in claim 13 wherein the arbitration means makes the determination on the basis of an identifier provided by the server.

15. A system as claimed in claim 14 wherein the browser application, after receiving content from the arbitration means stores the content in a memory.

16. A system as claimed in claim 1, wherein the terminal has an unpartitioned memory.

17. A system as claimed in claim 1, wherein the terminal further comprises a SIM card and a SIM card reader for reading the contents of the SIM card, the SIM card storing the first content identifier.

18. A system as claimed in claim 1, wherein the terminal further comprises means for creating content in association with an item and means for transferring the created content to the server.

19. A system as claimed in claim 18 wherein the created content transferred to the server updates the items stored therein for future transfer to the terminal.

20. A system as claimed in claim 18, wherein the means for creating content creates a new further item which is then transferred by the means for transferring content.

21. A system as claimed in claim 18, wherein the means for creating content adapts the content of an existing item which is then transferred by the means for transferring content.

22. A system as claimed in claim 18, wherein the means for creating content creates content in dependence on the accessing of items by the browser application.

23. A system as claimed in claim 22 wherein the means for creating content identifies that an item has been accessed.

24. A system as claimed in claim 1, wherein pairs of the further items are associated, the first further item of the pair holding content for access by the browser application and viewing by the user and the second further item of the pair storing content identifying a parameter associated with first item.

25. A system as claimed in claim 24 wherein the parameter identifies whether the first further item has been accessed by the browser application and viewed by the user.

26. A system as claimed in claim 18, wherein the means for creating content adapts the parameter of the second further item of a pair of further items when the first further item of the pair is accessed by the browser application.

27. A system as claimed in claim 24 wherein the second further item of the pair is used to provide a visual indication on the display.

28. A system as claimed in claim 18, wherein the means for transferring the created content composes a message comprising the created content for transfer to the server.

29. A system as claimed in claim 28, wherein the message is sent asynchronously to the server by the means for transferring created content.

30. A system as claimed in claim 28, wherein the message is stored in an output box buffer in the terminal until there is radio communication between the server and the terminal and is then emptied automatically.

31. A system as claimed in claim 28, wherein the means for transferring the created content is activated on exiting an application.

32. A system as claimed in claim 1, wherein each further item has means for exiting the further item when accessed by the browser application, wherein activation of the means for exiting updates the server and then the server transfers the updated item or items to the terminal.

33. A system as claimed in claim 1, wherein a further item when accessed by the browser application has exit means for exiting the further item and simultaneously exiting the application.

34. A system as claimed in claim 33 wherein the means for exiting is an event handler activated by the creation of an event on exiting an item accessed by the browser.

35. A system as claimed in claim 2, wherein the terminal provided with a second item is arranged to give an indication upon storage of an item in the terminal.

36. A system as claimed in claim 35, wherein said second item comprises at least a static part, and reserves or removes a reservation of an indication for a dedicated item.

37. A system as claimed in claim 35, wherein said second item comprises at least a dynamic part, and will enable the user to delete or insert an indication an indication of an arbitrary item.

38. A system as claimed in claim 37, wherein said second item comprises both a dynamic and a static part.

39. A system as claimed in claim 35, wherein said second item is further arranged to handle the indications in a First In First Out (FIFO) priority order.

40. A system comprising:
   at least one terminal and a server in radio communication therewith, the terminal including
   a receiver arranged to receive radio packets from the server,
   a memory,
   a browser application for displaying content, arranged to initiate a first application by reading a first item associated with the first application from the memory using a first content identifier, the first application being provided by the combination of the first item and further items each of which is accessible from the memory using an individual content identifier, and each of which comprises content or means for linking to content, and
   a user interface connected to the browser application having a display for displaying content and user input means; and
   the server having a transmitter for sending radio packets to the terminal and a storage for storing content, accessible for transfer to the terminal, the stored content comprising the first item and the further items, the first item on transfer to the terminal including
   identifying means for identifying to the browser application the content identifiers of the further items; and
   link means for automatically providing a link from the first item to each of a plurality of further items, each link using an individual content identifier, wherein activation of the links provides for access to the further items and thereby a functionality of the first application, wherein the server is arranged to asynchronously transfer the combination of first and further items to the terminal.

41. A server for providing and updating a first application on a terminal via radio communication, comprising:
   a transceiver for sending and receiving radio packets from the terminal and a storage means for storing content, accessible for transfer to the terminal, the stored content comprising a first item accessible using the first content identifier and further items, each of which is accessible using individual content identifiers, and each of which comprises content or means for linking to content, the first item including
   identifying means for identifying to a browser the content identifiers of the further items; and
   link means for automatically providing a link from the first item to each of a plurality of further items, each link using an individual content identifier, wherein activation of the links provides for access to the further items and thereby a functionality of the first application, wherein the server is arranged to asynchronously transfer the first item to the terminal.

42. A method of providing functionality of an application in a browser of a terminal by creating a hierarchy of inter-linked items by transferring the items over a radio link from a server, wherein entrance to said hierarchy is through a first item, accessible through the browser using a first content identifier, the first item identifying further items in the hierarchy accessible through the browser using content identifiers and providing for links to the further items using the content identifiers, comprising the steps of:
   initiating the application in the terminal by accessing the first item using its content identifier through the browser;
   transferring the first item from the server to the terminal;
   using the content identifiers of the further items in the first item to transfer the further items from the server to the terminal; and
   creating links between the first item and the further items, so that a functionality of the application results from activation of the links and wherein the server is arranged to asynchronously transfer the first item to the terminal.

* * * * *